United States Patent [19]

Carroll

[11] Patent Number: 4,951,749

[45] Date of Patent: Aug. 28, 1990

[54] EARTH FORMATION SAMPLING AND TESTING METHOD AND APPARATUS WITH IMPROVED FILTER MEANS

[75] Inventor: Jim F. Carroll, Lafayette, La.

[73] Assignee: Schlumberger Technology Corporation, Houston, Tex.

[21] Appl. No.: 356,310

[22] Filed: May 23, 1989

[51] Int. Cl.$^5$ .............................................. E21B 49/10
[52] U.S. Cl. .................................... 166/264; 166/100; 166/228; 73/155
[58] Field of Search ...................... 166/264, 100, 250; 73/155

[56] References Cited

U.S. PATENT DOCUMENTS

| | | | |
|---|---|---|---|
| 2,843,209 | 7/1958 | Degen | 166/228 |
| 3,173,488 | 3/1965 | Rensvold | 166/228 |
| 3,530,933 | 9/1970 | Whitten | 166/100 |
| 3,653,436 | 4/1972 | Anderson et al. | 166/100 |
| 3,864,970 | 2/1975 | Bell | 73/155 |
| 4,246,782 | 1/1981 | Hallmark | 73/155 |
| 4,292,842 | 10/1981 | Hallmark | 73/155 |
| 4,662,442 | 5/1987 | Debreuille | 166/250 |
| 4,754,807 | 7/1988 | Udo Lange | 166/236 |

FOREIGN PATENT DOCUMENTS 844766  7/1981  U.S.S.R. .

OTHER PUBLICATIONS

"Precision Porous Metals, Engineering Guide", Mott Metallurgical Corp., 16 pages.
"The superior alternative to gravel packing", from the firm Johnson, 4 pages, publication date not shown.

Primary Examiner—Stephen J. Novosad
Attorney, Agent, or Firm—Henry N. Garrana; Frederic Wagret

[57] ABSTRACT

A method for obtaining samples of connate fluids from formations traversed by a borehole, wherein a sample test chamber is brought in communication with an isolated portion of the borehole wall, and is opened so as to allow the connate fluids to fill the chamber, and wherein the connate fluids are filtered through porous material including particles of determined sizes. The particles are bound together so as to form a rigid porous member, and have an average diameter which is a multiple of the diameter of the formation particles. Filter includes sieved gravel/sand embedded in a thermosetting resin. Alternatively, the filter includes metal bound together by superficial melting or welding.

14 Claims, 3 Drawing Sheets

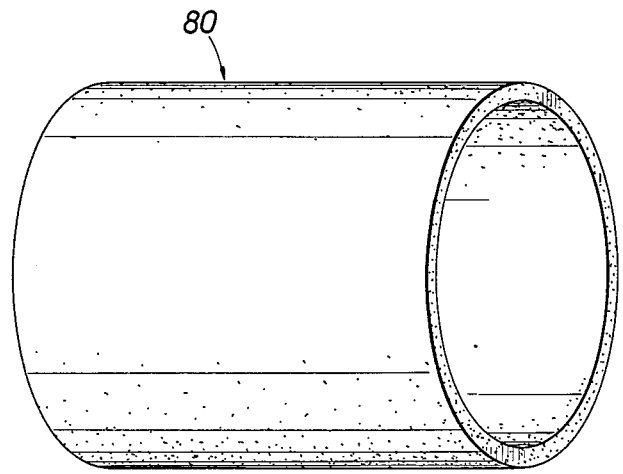
FIG. 4
FIG. 6B
FIG. 6A
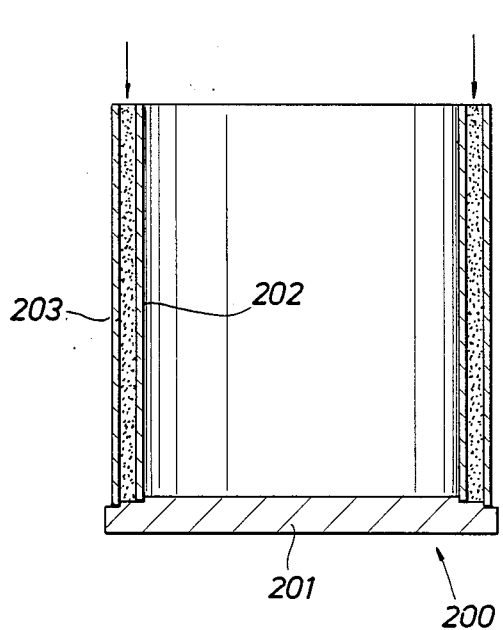
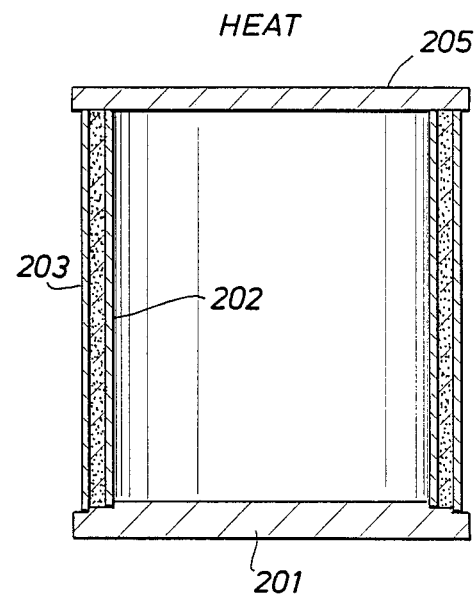
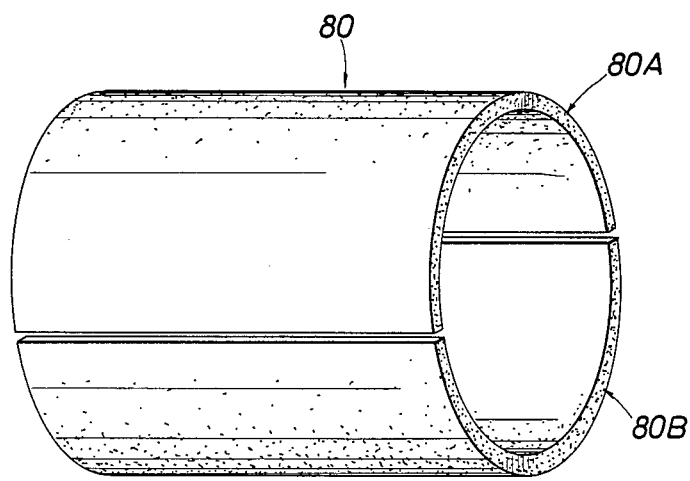
FIG. 6C

EARTH FORMATION SAMPLING AND TESTING METHOD AND APPARATUS WITH IMPROVED FILTER MEANS

BACKGROUND OF THE INVENTION

1. Field of The Invention

The present invention relates to a method and apparatus for determining the production capabilities of earth formations by placing a wireline formation testing tool into fluid communication with a selected formation interval and, when possible, collecting a representative sample of the connate fluids in that formation. During the sampling operation, it is also customary to obtain one or more measurements which are at least indicative of the formation pressures in the interval being sampled.

2. The Prior Art

Those skilled in the art will, of course, appreciate that many different arrangements of formation testers have been employed through the past several years. In general, these tools include either a fluid entry port or a tubular probe cooperatively arranged within a wall-engaging packer for isolating the port or probe from the well bore fluids during the test. To collect fluid samples, these prior-art tools have one or more sample chambers which are coupled to the fluid entry by a flow line having one or more control valves arranged therein. As shown in U.S. Pat. No. 3,011,554, for example,, a suitable pressure transducer is usually arranged in the flow line for transmitting pressure measurements to the surface by way of the cable supporting the tool.

Generally, the success of these tests has depended to some extent upon knowing in advance the general character of the particular formations which were to be tested, so that the sampler/tester could be equipped as required to test a formation of a given nature.

For example, where the formations to be tested were considered to be fairly competent and, therefore, not easily eroded, prior-art testers such as that shown in U.S. Pat. No. 3,011,554 have been relatively satisfactory. On the other hand, in those situations where tests were to be conducted in fairly incompetent or unconsolidated formations, it has heretofore been the practice to use testers such as those shown in U.S. Pat. Nos. 3,352,361; 3,530,933; 3,565,169; or 3,653,436. As fully described in these last-mentioned patents, each of those prior-art testing tools employs a tubular sampling member which is cooperatively associated with a conventional filter having fluid openings of a selected and uniform size for preventing the unwanted entrance of unconsolidated formation materials of a specified minimum size into the testing tool. Thus, except for dual-purpose tools such as that shown in U.S. Pat. No. 3,261,402, these prior-art formation-testing tools have been relatively successful in making tests in formations which are known in advance either to be fairly competent or to be relatively unconsolidated Moreover, since all of these prior-art testers can be operated only once during a single trip into a well bore, it has been customary to simply select in advance the particular size or type of filter believed to be best suited for a specific testing operation.

In unconsolidated formations, these tests are often impaired due to the migration of formation particles which plug the flow lines of the tool.

It has been proposed, by U.S. Pat. No. 3,926,463 a formation tester having fluid-admitting means adapted for selective movement into sealing engagement with a potentially-producible earth formation to isolate a portion thereof from the borehole fluids. The fluid-admitting means are provided with filter means having first and second cooperatively-associated filter members adapted for movement relative to one another and respectively provided with one or more filter passages that are each sized to easily pass large plugging material such as mudcake particles.

Of more significance to the previously-discussed problem of obtaining advance predictions about the potential productivity of a given formation, the known formation-testing tools, such as described in U.S. Pat. No. 3,811,321 and 3,813,936, include an enclosed test chamber which is selectively expanded for initially reducing the pressure therein and then suddenly communicated with a formation to be tested for rapidly enduing a small sample of producible connate fluids into the expanded chamber. This unique operation attempts to momentarily reduce the pressure of the incoming fluid sample for obtaining in advance a meaningful pressure-buildup curve which is at least representative of the potential productivity of the formation under test.

Similarly, U.S. Pat. No. 3,782,191 shows a formation-testing apparatus comprising filter means including selectively-operable valve means, cooperatively arranged for selective movement between an open position which allows communication between an isolated earth formation and the filter means, and a normally closed position preventing communication with the filter means.

Another known tool has been proposed, such as described in U.S. Pat. No. 3,934,468, and including a wall-engaging sealing pad carrying an extendable filter probe coaxially supported therein by a tubular valve member. Dependent upon whether the formation being tested is incompetent or competent, the filter either is advanced into the formation or remains in its normally retracted position.

Furthermore, U.S. Pat. No. 3,952,588 depicts a formation-testing apparatus having filter means including particle-collecting means cooperatively arranged for selective movement between a normally extended position for collecting plugging materials and blocking the filter means, and a retracted position for withdrawing those materials from the flow path through the now-exposed filtered fluid inlet.

Nevertheless, the known apparatus as described in the five last-mentioned U.S. patents rely on relatively complicated moving mechanism.

Typically, the prior-art filter members have been an elongated tubular member having only a plurality of narrow slits of a uniform width which are disposed either longitudinally or circumferentially. U.S. Pat. No. 3,352,361 is an example of this previous practice.

In any case, these prior-art tools have employed conventional filters having only uniformly sized filter openings which are customarily sized as dictated by the particular size of loose formation particles which were expected to be encountered during a given operation.

It has been found, however, that when these prior-art filters are used in soft formations, the pressure drop across the filtering element and the accumulated formation particles will often become so excessive that a fluid sample simply cannot be obtained in a reasonable period of time. This is easily understood, since, by virtue of the additional flow resistance imposed by the tightly-packed column of finely-divided sand particles which will be trapped in the sampling tube, most, if not all, of the flow will be through the forewardmost openings in the filter screen; thus, since, at best, little or none of the flow will be through the rearward portions of the screen, the overall flow rate will be drastically curtailed.

Moreover, experience has shown, that if the screen openings are slightly over-sized so that some sand grains will pass through the front openings, it is not at all uncommon for the sand to gradually erode the filter screen to the point that the screen is no longer effective. Thus, enlargement of the openings to improve the flow rate will often result in rapid failure of the filter.

Another known approach led to providing a screen, as shown in U.S. Pat. No. 3,864,970, in the form of a filter member designed to trap the incoming sand particles and form a compacted column of these particles and comprising slits: the rearwardmost openings are individually wider than the forewardmost openings; the several filter openings are arranged in multiple sets (of two or three slits); the respective sets have slits of incrementally increased size along almost the full length of the filter. The rear filter openings are selectively sized so that the fine particles, having entered the fluid-admitting means, bridge the rear openings, and are supposed to thereafter serve as an auxiliary filtering medium.

A more-serious problem is encountered, however, when a prior-art testing tool, equipped with a conventional filter having very narrow slits, is used to test a fairly competent or hard formation. In this situation, the usual result will be that the mudcake entering the sampling tube will swirl around inside of the tube so that the internal or inlet face of the filter screen will be quickly coated with the mudcake particles thereby plugging the narrow filter openings. Heretofore, the only practical solution to this problem has been to use a screen with the largest-possible openings that will still trap any loose formation materials which might be encountered. This obviously poses a problem where formations composed of different degrees of hardness or competency are expected to be encountered during a multi-formation testing operation such as is capable of being performed by the tool. Thus, if the filter openings are too large, sand will easily pass through the filter screen when unconsolidated formations are tested. On the other hand, if the screen openings are too small, they will be easily plugged by mudcake when hard formations are tested.

There are often situations where the performance of these known testers is significantly affected since there has heretofore been no one conventional filtering medium capable of operating efficiently with every type of earth formation. For instance, if one of these testers must be equipped with a conventional filter which is capable of stopping exceptionallyfine formation materials, the flow rate for this tester will be materially limited even when a fairly competent formation is being tested. More importantly, in situations like this, it is not at all uncommon for the necessarily-fine openings in a conventional filter to be quickly plugged by the normally-large particles of mudcake which usually line the borehole, adjacent to a potentially-producible formation. Thus, a test under these conditions will often be inconclusive, if not misleading, since it will not be known for sure whether the formation is truly unproductive or if the filter was simply plugged at the outset of the test. On the other hand where the tester is instead equipped with a conventional filter having openings designed for filtering out only fairly-large particles, there will often be an excessive induction of very-fine formation materials into the tool when the tool is testing a highly unconsolidated formation. This action will of course, frequently result in a continued erosion of the formation wall around the sealing pad so that insulated communication with the formations is quickly lost. This also causes an incomplete or inconclusive test.

It will be recognized, of course, that it is wholly impractical to change the filter in a repetitively-operable tool of this type between tests of different types of formations in a given borehole. Moreover, there is no assurance that the character of various potentially-producible formations traversed by a given borehole can even be reliably determined in advance.

Although, for the large part, the utilization of the several above-mentioned tools has been relatively successful in commercial operations, it is recognized that there is still a need for a formation testing and sampling tool with reliable filtering ability.

OBJECT OF THE INVENTION

It is a general object of the invention to provide a new and improved formation sampler-tester with satisfactory filter means, thus able to increase substantially the reliability of the formation sampling techniques and pressure data.

It is a further object of the invention to propose a formation tester provided with filter means easy to manufacture, to mount and to use.

SUMMARY OF THE INVENTION

These objects and other are attained, according to the invention, with a method for obtaining samples of connate fluids from formations traversed by a borehole, comprising the steps of:
1. isolating, from the borehole fluids, a portion of the wall surface of said borehole adjacent to an earth formation believed to contain producible connate fluids;
2. communicating a sample test chamber in contact with said wall surface, and
3. opening said test chamber thereby allowing said connate fluids to fill said chamber; and
4. filtering said fluids so as to prevent invasion of unwanted particles into said chamber;

wherein,
said filtering step includes making said connate fluids flow through porous material including particles of determined sizes.

More particularly, the particles are bound together so as to form a rigid porous member.

According to a first embodiment, said particles are rock particles, such as gravel or sand.

Advantageously, the average diameter of said filter particles is a multiple of the diameter of the formation particles; specifically, filter particle diameter is between two and ten times the diameter of formation particles; a preferable value is six times.

More particularly, said porous material includes sieved gravel/sand embedded in a binder. Said binder is preferably a thermosetting resin.

According to a second embodiment, said particles are metal particles.

More specifically, the metal particles are bound together through superficial melting or welding.

Advantageously, the filtering porous material is of a substantially cylindrical shape.

The invention relates also to an apparatus for sampling connate fluids from earth formations traversed by a borehole and comprising:

a body having a fluid passage adapted to receive connate fluids;

fluid-admitting means on said body, including a sample-test chamber, and adapted to engage a wall of said borehole for isolating a portion thereof from borehole fluids;

means on said body and selectively operable for positioning said fluid-admitting means against said wall to place said chamber in communication with earth formation beyond said wall; and filter means disposed in the path of said connate fluid coming from earth formations towards said chamber;

wherein, said filter means are made of a porous material including particles of predetermined sizes.

Preferably, the filter means is constituted by a rigid member made of particles bound together.

Filter means are made of rock particles embedded in a binder. As an alternative, filter means are made of metal particles bonded together by superficial melting or welding.

In a preferred embodiment, the filter means comprise a cylindrical screen surrounded concentrically by a cylindrical porous filter made of particles of a predetermined size and bonded together.

The invention contemplates also a method for manufacturing new and improved filter means comprising the steps of:

filling a mould, defining a chamber having two opposing substantially parallel walls, a closed end and an open end, with particles of predetermined sizes;

closing the mould;

submitting said mould to external conditions such that said particles are bound together, so as to make a substantially rigid filter; and opening said mould and removing said filter.

More specifically, the method may further include the step of providing separation in said mould, so as to make two complementary shaped filter members, and assembling the two members concentrically on a complementary screen and fixing said two members together.

Preferably, said mould chamber is of a cylindrical shape, with a circular base.

In a first embodiment, the particles are metal particles, and the mould is submitted to heat, so as to melt superficially said particles and bind them together.

In a second embodiment, said particles are rock particles coated with a binder. Preferably, the binder is made of thermosetting resin.

Alternatively, the invention contemplates a method of manufacturing filter means for an apparatus for collecting connate fluids from earth formations traversed by a borehole, said filter including a screen, comprising the steps of:

defining a closed space between the external wall of said screen and an outer cover, said space being closed with the exception of at least one opening;

filling said space, through said opening, with particles of determined sizes;

submitting said mould to external conditions such that said particles are bound together so as to make a rigid porous filter;

removing said outer cover.

The advantages and further objects of the present invention may be best understood by way of the following description of exemplary apparatus employing the principle of the invention, as illustrated in the accompanying drawings, in which:

BRIEF DESCRIPTION OF THE DRAWINGS

FIG. 3 and FIG. 4 are perspective views respectively of the screen and the complementary porous filter according to the invention;

FIG. 5 is a perspective view of the screen and the associated cover for manufacturing the filter of the invention; and FIG. 6A, 6B and 6C are schematic views of successive steps of an alternative manufacturing method.

DETAILED DESCRIPTION

Figure 1:
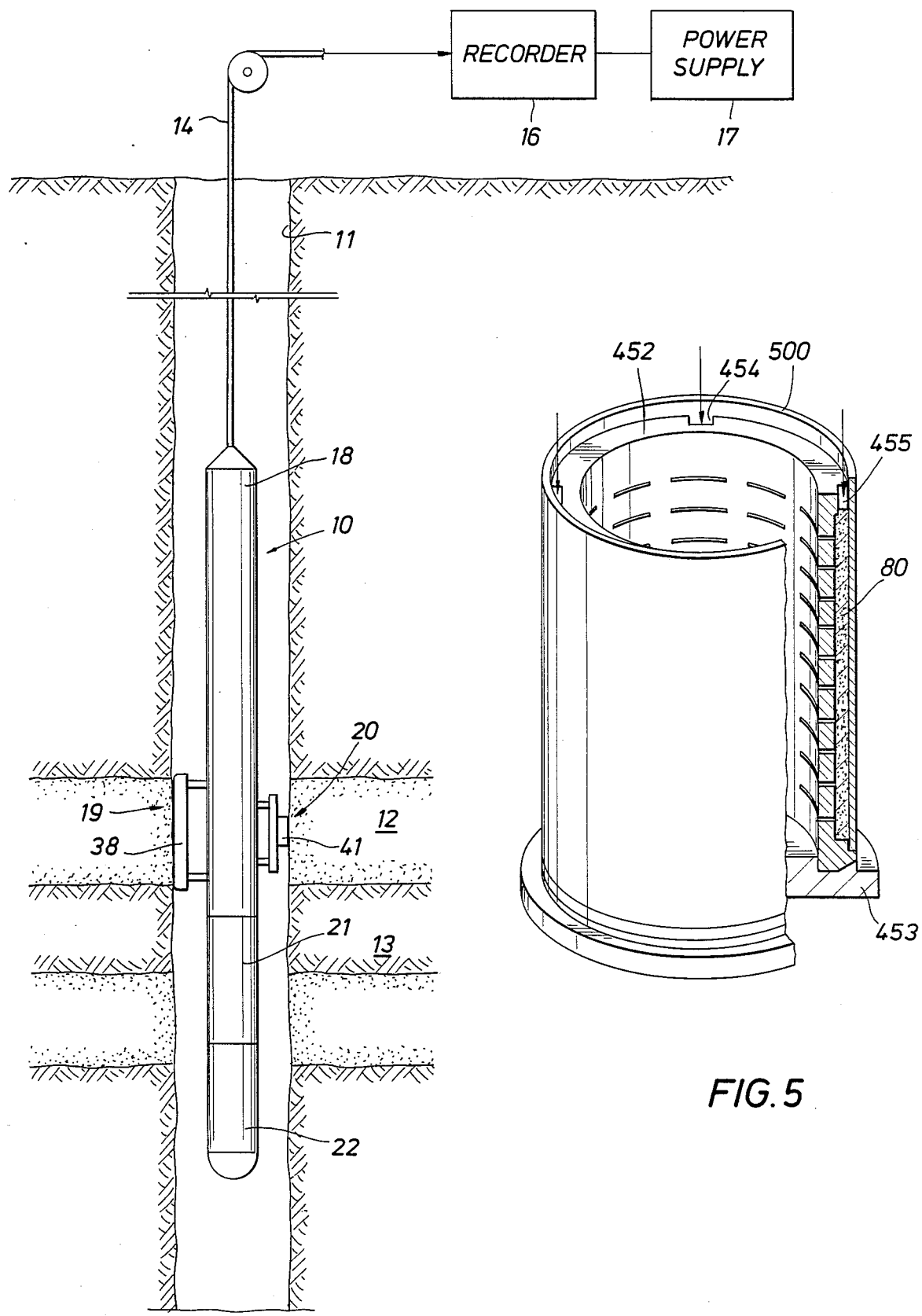
FIG. 1 is an example of an embodiment of a logging tool practicing the invention.

Turning now to FIG. 1, a preferred embodiment of a new and improved sampling and testing tool 10, incorporating the principles of the present invention is shown as it will appear during the course of a typical testing and sampling operation in a borehole 11 penetrating one or more earth formations, as at 12 and 13. As illustrated, the tool 10 is suspended in the borehole 11 from the lower end of a typical multiconductor cable 14 that is spooled in the usual fashion on a suitable winch (not shown) at the surface and coupled to the surface tool-control system including a typical recording apparatus 16 and a power supply 17. In its preferred embodiment, the tool 10 includes an elongated body 18 which carries selectively-extensible tool anchoring means 19, and new and improved fluid admitting means 20, arranged on opposite sides of the body, as well as one or more tandemly-coupled fluid-collecting chambers 21 and 22.

Figure 2:
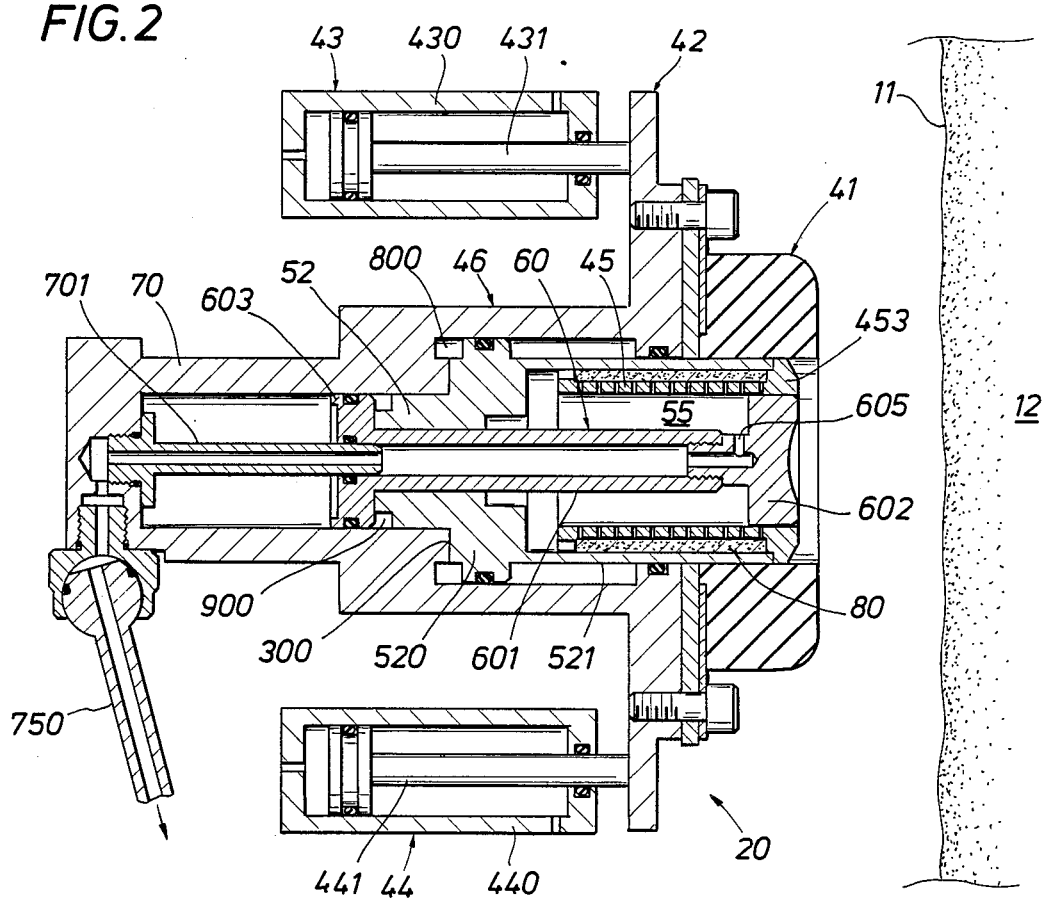
FIG. 2 shows a cross section of the sampling-testing means of the logging tool.

As shown in greater detail on FIG. 2, the fluid-admitting means 20 include a plate 42, bearing, on its front side, a sealing pad 41, made of elastomer material, and designed to be brought into engagement with the borehole wall, so as to isolate a portion of the borehole wall. As a general matter, the terms "rear" and "front" are hereafter used in connection with an imaginary vertical axis on FIG. 2; "front" means towards or facing the right side of FIG. 2 (i.e. on the side of the formations to be tested), while "rear" means towards or facing the left side of FIG. 2. The sealing pad 41 and the plate 42 are provided with concentric openings. The rear side of the plate 42 is bound up with a generally U-shaped housing 46, the open side of which faces the opening provided in the plate 42. A U-shaped intermediate piece 52 is slidably mounted inside said housing 46, and comprises a base 520 abutting against a shoulder 300 provided on the internal wall of the housing 46, and a tubular part 521 of a complementary diameter to the diameter of the openings provided in the plate 42 and the sealing pad 41. The tubular part 521, in its start position shown on FIG. 2, ends ahead of the front surface of the sealing pad 41. A tubular member 45 is slidably mounted in the tubular part 521 of the intermediate piece 52. A piston 60 is movably mounted inside and coaxially with said tubular member 45, and comprises a hollow rod 601 with an enlarged rear end 603 able to be translated parallel and inside the rear part 70 of the housing 46. The piston 60 has also an enlarged front end 602 of a diameter which is complementary to the diameter of said tubular member 45. The internal wall of tubular member 45, the rod 601 and the front end 602 define a chamber 55 in the shape of a cylinder annulus. The hollow rod 601 comprises at its front end an internal conduit 605. A tube 701, fixed on the bottom of said housing rear part 70, is concentrically arranged with the rod 601 so that the tube 701 may penetrate the rod 601 when the latter is translated. The tube 701 is also connected, through the bottom wall of the housing rear part 70, to a pipe 750 linked to the fluid-collecting chambers 21, 22. Thus, when chamber 55 is put in communication with the borehole wall (as it will be further described), fluid may flow from the formations, through chamber 55, conduit 605, hollow rod 601, tube 701 and pipe 750 towards fluid collecting chamber 21 (or 22), in a manner similar to the one described in U.S. Pat. No. 3,813,936.

Between the intermediate piece 52 and the shoulder 300 (provided on the internal wall of the housing 46), is provided an empty space 800. Similarly, an empty space 900 is provided between the bottom of the intermediate piece 52 and the rear end 603 of piston 60. Both spaces 800 and 900 may be connected to a fluid pressure source.

Piston actuators 43 and 44 are linked to the rear part of the plate 42, on either side of the housing 46; cylinders 430 and 440 are fixed to the tool 10, while pistons 431 and 441 are able, when actuated to translate the plate 42 along with the elements related thereto. The pipe 750 is related, at one end, to the tool 10, and at the other end, to the moving fluid-admitting means; accordingly, the pipe 750 is mounted for rotation on the housing rear part 70.

Figure 3:
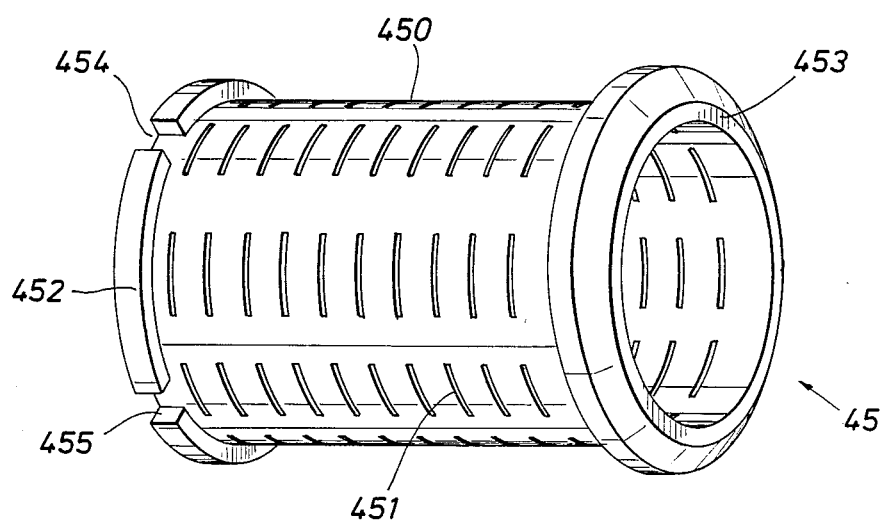

FIG. 3 shows at a greater scale the tubular member 45 comprising a cylindrical screen 450, provided with circumferential slots 451 (of calibrated size), a rear end 452 and a front end 453; both ends 452 and 453 protrude with respect to the surface of said cylindrical screen 450. The rear end 452 includes recesses regularly spaced along its periphery, only two of which are shown, bearing references 454 and 455. Front end 453 (or nose 453) is designed to penetrate into the borehole wall. The cylindrical screen 450 is surrounded by a cylinder shaped filter 80, which will be described in detail further.

The operation of the borehole fluid-admitting means 20, which are above described, is hereafter described, and more details can be found, as far as mechanical features are concerned, in U.S. Pat. No. 3,813,936 or in any of the other U.S. patents already referred to previously, and which are here incorporated by reference. Simply put, in connection with FIG. 1 and FIG. 2, as soon as the tool 10 reaches the required depth, the engaging member 38 (on one side of the tool) is translated towards the borehole wall. At the same time, the piston actuators 43, 44 (on the other side of the tool) are extended so as to push plate 42 and sealing pad 41 towards the formations to be tested. The pressure is increased in the piston actuators 43, 44 until a predetermined reference pressure value is reached. The sealing pad is at that moment maintained in tight engagement with an isolated portion of the borehole wall. Pressure is then applied in space 800 (between housing 46 and intermediate piece 52) so that the tubular member 45 is translated forward (i.e. towards right on FIG. 2) and penetrates into the mudcake, usually covering the borehole wall, and also into the formation. The tubular member 45 is, at that moment, protruding with respect to the sealing pad 41. The next step consists in applying pressure in space 900 (between bottom of the intermediate piece 52 and the rear end 603 of piston 60), in order to translate backward (i.e. towards left on FIG. 2) the piston 60, until front end 602 is situated substantially at the middle of the screen 450. The front end 602 separates in two halves the chamber 55, with the front half facing the formations. The fluid from the formations is thus allowed to flow through the slots 451 of screen 450 and through the filter 80 provided concentrically on the external wall of screen 450. The fluid, after having passed the filter 80, cannot go further radially because of the tubular part 521; thus, the fluid flows back to the rear half of chamber 55, and successively through conduit 605, hollow rod 601, tube 701, pipe 750, and finally to the sample-chamber 21 (or 22).

In a preferred embodiment, the filter 80 is made of rock particles, such as sieved gravel or sand, of a predetermined size, bound together with a binder, such as a thermosetting resin, so as to form a rigid cylinder with a circular base, such as shown on FIG. 4. The rock particles used for the filter 80 are preferably of the same average diameter. The filter particles have an average diameter related to the diameter of the formation particle diameter; the filter particle diameter defines the permeability of the filter. The rock particles are preferably sphere shaped. The filter, as an alternative, may be made with a mixture of given quantities of particles of different diameters.

An example of a method for manufacturing the filter 80 and mounting the same concentrically on the screen 450, is described hereafter, especially in connection with FIG. 5.

A cover cylinder 500, open at both ends, and having an inner diameter greater than the outer diameter of the tubular member 45, is disposed concentrically with said tubular member 45. One end of the cover cylinder 500 abuts the front end 453 of the tubular member 45. Thus, a void cylinder annulus is left between the internal wall of the cover cylinder 500 and the external wall of the cylinder screen 450. Said cylinder annulus is then filled with a mixture of rock particles, such as sieved gravel or sand, of a predetermined size, and a thermosetting resin, such as a phenolic resin available from the ACME RESIN Company. The mixture is actually poured through openings formed by recesses, such as 454 and 455, provided in the bottom end 452 of the tubular member 45. The four vertical descending arrows indicate where are poured the particles. The whole set is submitted to heat, in an oven at e.g. 300 degrees Farenheit (about 140 degrees Centigrade), for 30 minutes. After a cooling period, the cover cylinder 500 is then removed. The mixture of particles and resin has become a rigid cylinder filter 80 surrounding concentrically the screen 450, and abutting the front and rear ends 453 and 452 of the tubular member 45.

By way of non limiting example, the filter may be made with sieved gravel including particles of average diameter of 0.023 inches (about 0.06 centimeter). The filter may have a length of 1.78 inches (about 4.52 centimeters), a 1.38 inches external diameter (3.5 centimeters), and a thickness 0.13 inches (about 0.33 centimeter).

An alternative method of manufacturing the filter 80, is now described in connection with FIG. 6A, 6B and 6C. FIG. 6A shows a cross section of a mould 200 comprising a base 201, a cylindrical part 202 and an outer cover 203. The respective diameters of the cylinder 202 and of the outer cover 203 are such that a cylindrical annulus 204 of void space is left between the inner cylinder 202 and the outer cover 203. This void is then filled with rock particles which have been preliminarily coated with thermosetting resin. The mould is then closed with a top cover 205 and submitted to heat (see FIG. 6B), so that the resin bonds the particles together. After being cooled down, the mould is opened and the filter 80, made from embedded particles, is removed. FIG. 6C shows a perspective view of the resulting cylindrical filter 80, made actually of two hemi-cylindrical halves 80A and 80B. The next and last step consists in assembling these two halves, concentrically around the screen 450 (see FIG. 3), and fixing together (e.g. by glue) said halves on their respective facing longitudinal edges. The outer diameter of mould cylinder 202 corresponds substantially to the outer diameter of the screen 450, so that filter 80 fits on said screen. Similarly, the height (along the longitudinal axis) of mould 200 corresponds to the distance separating one from the other the rear and front ends 452 and 453 of the tubular part 45 bearing the screen 450.

The filter hereabove described is made of rock particles embedded in a thermosetting resin. As an alternative, the particles may be metal particles of a predetermined size. The manufacturing method of such a filter is substantially the same as the method described in connection with FIG. 5, or the method described in connection with FIG. 6A, 6B, and 6C. The difference with the filter made of rock particles resides in the fact that the metal particles filling said annulus void space are submitted to heat and consequently melt superficially so that said particles become bond one to the other while leaving internal interconnected voids; the resulting filter is thus rigid and porous. An example of metal used is a steel based alloy, and the particle size may be e.g. 100 microns.

The filter 80 according to the invention has two major advantages, with respect to prior art filters, i.e., firstly it allows a substantial reduction in the formation fluid speed (thus reducing the amount of incoming particles from formations), and secondly it prevents, to a large extent, formation fine particles from plugging the sampling apparatus.

Furthermore, the filter according to the invention is cheap and easy to manufacture; accordingly, it may be easily changed if required after a few sampling operations. Moreover, it has to be noted that the size of the slots provided on the screen 450 is not critical; this increases substantially the flexibility of the apparatus.

Although the invention has been described and illustrated with reference to a specific embodiment thereof, it will be understood by those skilled in the art that various modifications and variations of that embodiment may be made without departing from the invention concepts disclosed. Accordingly, all such modifications are intended to be included within the spirit and scope of the appended claims.

What is claimed is:

1. A method for obtaining samples of connate fluids from formations traversed by a borehole, comprising the steps of:
    (a) isolating, from borehole fluids, a portion of the wall surface of said borehole adjacent to an earth formation believed to contain producible connate fluids from borehole fluids;
    (b) communicating a sample test chamber in contact with said wall surface;
    (c) opening said test chamber thereby allowing said connate fluids to fill said chamber; and
    (d) filtering said fluids, at a location between said test chamber and said wall surface, so as to prevent any invasion of unwanted particles into said chamber; wherein,
    said filtering step includes making said connate fluids flow through porous material including particles of determined sizes bound together so as to form a rigid porous member.

2. The method according to claim 1 wherein said porous member filter is made of gravel or sand particles embedded in a binder.

3. The method according to claim 2 wherein said binder is a thermosetting resin.

4. The method according to claim 1 wherein said filter particles diameter is between two and ten times the diameter of formation particles.

5. The method according to claim 1 wherein said porous member has a substantially cylindrical shape.

6. The method according to claim 1 wherein said particles are metal particles bound together by superficial melting.

7. The method according to claim 6 wherein said metal is a steel-based alloy.

8. An apparatus for collecting samples of connate fluids from earth formations traversed by a borehole, comprising:
    (1) a body having a fluid passage adapted to receive connate fluids;
    (2) fluid-admitting means on said body, including a sample-test chamber, and adapted to engage a wall of said borehole for isolating a portion thereof from borehole fluids;
    (3) means on said body and selectively operable for positioning said fluid-admitting means against said wall to place said chamber in communication with earth formations beyond said wall; and
    (4) filter means disposed in the path of said connate fluid between said borehole wall and said chamber, wherein, said filter means is made of a porous material including particles of predetermined sizes bound together so as to form a rigid porous member.

9. The apparatus according to claim 8 wherein said particles are rock particles, such as gravel or sand.

10. The apparatus according to claim 8 wherein said average particle diameter is between two and ten times the diameter of formation particles.

11. The apparatus according to claim 8, wherein said porous material is made of rock particles embedded in a binder.

12. The apparatus according to claim 11 wherein said binder is a thermosetting resin.

13. The apparatus according to claim 8 wherein filter means has a substantially cylindrical shape.

14. The apparatus according to claim 8 wherein said particles are metal particles bound together by superficial melting.

* * * * *